(12) United States Patent
Yamamoto et al.

(10) Patent No.: US 7,588,658 B2
(45) Date of Patent: Sep. 15, 2009

(54) LASER-TRANSMISSIBLE RESIN COMPOSITION AND METHOD FOR LASER WELDING USING IT

(75) Inventors: Satoshi Yamamoto, Neyagawa (JP); Heihachi Yushina, Neyagawa (JP); Osamu Nakagawa, Neyagawa (JP)

(73) Assignee: Orient Chemical Industries, Ltd., Neyagawa-shi (JP)

( * ) Notice: Subject to any disclaimer, the term of this patent is extended or adjusted under 35 U.S.C. 154(b) by 127 days.

(21) Appl. No.: 10/567,096

(22) PCT Filed: Aug. 10, 2004

(86) PCT No.: PCT/JP2004/011730

§ 371 (c)(1),
(2), (4) Date: Feb. 21, 2006

(87) PCT Pub. No.: WO2005/021244

PCT Pub. Date: Mar. 10, 2005

(65) Prior Publication Data

US 2007/0056684 A1    Mar. 15, 2007

(30) Foreign Application Priority Data

Aug. 27, 2003  (JP) .............................. 2003-303638

(51) Int. Cl.
    B32B 38/04  (2006.01)
    C08K 3/22  (2006.01)
(52) U.S. Cl. .................................... 156/272.8; 524/497
(58) Field of Classification Search .............. 156/272.8; 524/497
    See application file for complete search history.

(56) References Cited

U.S. PATENT DOCUMENTS

| | | | | |
|---|---|---|---|---|
| 3,459,575 | A | * | 8/1969 | Bertha et al. ................. 106/446 |
| 4,689,364 | A | * | 8/1987 | Mumcu et al. ............... 524/497 |
| 5,804,315 | A | | 9/1998 | Takimoto et al. |
| 5,893,959 | A | | 4/1999 | Muellich |
| 5,998,119 | A | * | 12/1999 | Aylward et al. ............. 430/536 |
| 6,596,122 | B1 | * | 7/2003 | Savitski et al. ........... 156/304.2 |
| 7,148,286 | B2 | * | 12/2006 | Baumann et al. ............ 524/497 |
| 2002/0002225 | A1 | | 1/2002 | Reil |
| 2003/0125429 | A1 | | 7/2003 | Joachimi et al. |
| 2004/0138363 | A1 | | 7/2004 | Baumann et al. |

FOREIGN PATENT DOCUMENTS

| | | |
|---|---|---|
| EP | 1 029 650 A1 | 8/2000 |
| EP | 1 411 087 A1 | 4/2004 |

(Continued)

*Primary Examiner*—Philip C Tucker
*Assistant Examiner*—Michael N Orlando
(74) *Attorney, Agent, or Firm*—Oliff & Berridge, PLC (57) ABSTRACT

Disclosed is a laser-transmissible resin composition for laser welding having 100 parts by weight of a thermoplastic resin, and 0.01 to 3 parts by weight of titanium oxide that has a density of at least 4 g/cm$^3$ and an average particle size of 100 to 400 nm; and the resin composition exhibits a whitish hue of white, gray or tint color. Also disclosed is a method for laser welding that includes piling a resin workpiece that is at least partly capable of laser-absorption onto a laser-transmissible resin workpiece that is molded out of the laser-transmissible resin composition, and irradiating a laser beam thereto to weld thermally.

12 Claims, 2 Drawing Sheets

FOREIGN PATENT DOCUMENTS

| | | |
|---|---|---|
| JP | A-09-510930 | 11/1997 |
| JP | A-11-170371 | 6/1999 |
| JP | A-2000-309694 | 11/2000 |
| JP | A-2003-517075 | 5/2003 |
| WO | WO 95/26869 A1 | 10/1995 |
| WO | WO 01/44357 A1 | 6/2001 |

* cited by examiner

LASER-TRANSMISSIBLE RESIN COMPOSITION AND METHOD FOR LASER WELDING USING IT

TECHNICAL FIELD

This invention relates to a laser-transmissible resin composition for using as base material of a resin workpiece for laser welding exhibiting an opaque whitish hue of white, gray or tint color, and a method for the laser welding using it.

BACKGROUND

For joining thermoplastic resin workpieces, an adhesion method using an adhesive agent and a welding method such as vibration welding, ultrasonic welding and laser welding, that melt resin to weld partially, are known.

The adhesion using the adhesive agent is avoided with regard to viewpoints of environment, safety and health, because of volatilization, diffusion and remainder of solvents.

The welding using vibration or ultrasonic is avoided with regard to viewpoints of quality and yield, because it is easy to transform or damage by exposing excess mechanical stress or overheating at wide area of the resin workpiece, and it is necessary to have to cut burrs at the welded position.

The laser welding is executed for example as follows. A laser-transmissible resin workpiece is piled onto a laser-absorptive resin workpiece. A laser beam is irradiated from above, and transmits through the transmissible resin workpiece. The laser beam reaches to the absorptive resin workpiece, and is absorbed into there, and causes the exothermic at limited area gently. Both resin workpieces melted by the laser beam thermally are joined.

The laser welding is satisfactory with regard to viewpoints of environment, safety and health because of no volatilization of solvents. And it is satisfactory to join the resin workpieces having complicated shape with sufficient strength by simple procedure at high yield without threat of exposing of stress or overheating.

Therefore, the laser welding is suitable to be executed in the manufacturing process of a precision instrument, electronic parts and a medical device that should avoid the thermal and vibratory influence to join the resin workpieces precisely.

In Japanese Patent Provisional Publication Nos. 9-510930 and 11-170371, the methods for laser welding of a laser-transmissible resin workpiece that is transparent, colorless, non-colored or black-colored, and a laser-absorptive resin workpiece that is opaque or black-colored are mentioned for instance.

According to the previous method of the laser welding of the transparent laser-transmissible resin workpiece and the laser-absorptive resin workpiece, the welded position has been visible unfortunately. Therefore usage has been practically limited.

According to the previous method of the laser welding of the laser-transmissible resin workpiece and the laser-absorptive resin workpiece having different color or same black respectively, the suitable hue and usage thereof have been limited.

If the laser welding of the previous white, clean and pretty resin workpieces including the white pigment such as zinc oxide is executed, it is inadequate for the strength thereof because the pigment is easy to reflect and disperse the laser beam, and does not make the laser beam transmit sufficiently.

The present invention has been developed to solve the foregoing problems.

It is an object of the present invention to provide especially a laser-transmissible resin composition exhibiting whitish hue of high whiteness degree. The composition is used as whitish base material for forming a workpiece that is capable of laser-transmission and the laser welding simply.

It is another object of the present invention to provide a method for the laser welding using it.

SUMMARY

A laser-transmissible resin composition for laser welding of the present invention developed for accomplishing the foregoing object is explained. The laser-transmissible resin composition for the laser welding comprises:

100 parts by weight of a thermoplastic resin, 0.01 to 3 parts by weight of titanium oxide that has density of at least 4 g/cm$^3$ and an average particle size of 100 to 400 nm;

and exhibits whitish hue of white, gray or tint color.

The composition comprises an appropriate amount of fine titanium oxide having high density. When the resin workpiece is molded out of the composition, it is capable of transmitting a suitable amount of the laser beam. It causes sufficient welding strength thereof and improves whiteness degrees. When titanium oxide acts as a filler, the molded workpiece has the suitable strength thereof.

If the amount or the average particle size of titanium oxide is less than the range, the workpiece molded out of the composition is translucent visually and has insufficient hiding power.

If it is more than the range, the workpiece molded out of the composition executes the laser welding imperfectly. Because it increases the amount of absorption or reflective diffusion of the laser beam by titanium oxide on the occasion of the laser welding, and the laser beam transmits insufficiently.

It is further preferable that an average particle size of titanium oxide is 200 to 270 nm, because of obtaining the resin composition having the whitish pretty hue.

It is preferable that a refractive index: $n_1$ of titanium oxide and a refractive index: $n_2$ of the thermoplastic resin satisfy following numerical expressions (1) and (2).

$$n_1 - n_2 \geq 1.0 \tag{1}$$

$$1.4 < n_2 < 1.7 \tag{2}$$

When the composition comprises combination of selected titanium oxide and the thermoplastic resin that satisfy the numerical expressions (1) and (2) respectively, titanium oxide is kept fine to disperse into the resin of the composition homogeneously. The workpiece molded out of the composition dispersing titanium oxide exhibits the whitish hue uniformly, and has ability to transmit the sufficient laser beam for the laser welding.

But when the composition comprises combination thereof that does not satisfy the numerical expressions alternatively, titanium oxide does not disperse into the resin of the composition sufficiently. The workpiece that is molded out of the composition dispersing titanium oxide insufficiently exhibits dapple whitish hue unevenly, and absorbs the laser beam at the surface thereof. Consequently the workpiece does not have ability to transmit the sufficient laser beam for the laser welding.

An example of titanium oxide called titanium dioxide is a white pigment such as C. I. Pigment White 11. It is further preferable that the refractive index: $n_1$ thereof ranges from 2.72 to 2.78. The surface of titanium oxide may be treated by a surface treatment agent that is selected from an inorganic compound such as aluminum, alumina, zirconia, silicon and silicon-including inorganic compound; or an organic compound such as aluminum laurate, and aluminum stearate. The surface treatment agent is beforehand kneaded with titanium oxide, and adhered onto the surface thereof to treat. Consequently titanium oxide is easy to disperse homogeneously, because compatibility with the thermoplastic resin and titanium oxide is improved. The white pigment as titanium oxide is commercially available as various titanium oxide powder or surface-treated titanium oxide powder. The titanium oxide powder may be used solely or plurally with mixing. It is further preferable that titanium oxide has oil absorption ranging from 15 g/100 g to 23 g/100 g, because it possesses excellent hiding power.

Titanium oxide is appropriately selected from titanium oxide that is known and commercially available. Examples thereof are titanium oxide TIPAQUE series or ET series that are available from Ishihara Sangyo Kaisha, LTD., titanium oxide KRONOS series that is available from Titan Kogyo Kabushiki Kaisha, titanium oxides that are available from Sakai Chemical Industry CO., LTD., Tayca Corporation, Tohkem Products CO., LTD. or Tayca Corporation.

The thermoplastic resin has sufficient laser-transmissible property. Examples thereof are polyamide resin, polyethylene resin, polypropylene resin, polybutylene terephthalate resin, polyphenyl sulfide resin, polyether-ether-ketone resin, polyethylene terephthalate resin, polycarbonate resin, liquid crystal polymer, polystyrene resin, acrylic resin, polyacetal resin, polyphenyl-ether resin, acrylonitrile-styrene copolymer resin, acrylonitrile-butadiene-styrene copolymer resin. As the thermoplastic resin, they may be used solely, or they are used to mix plurally. The thermoplastic resin may be copolymer including principally the above-mentioned resin or mixture thereof; mixture of the resin and rubber or elastomer such as rubber-like resin; polymer alloy including 10% by weight or more of the resin. It is further preferable that the thermoplastic resin is the polypropylene resin and/or the polycarbonate resin.

The laser-transmissible resin composition may include an additive agent such as a colorant, filler and a flame retarder that is capable to transmit the sufficient laser beam for the laser welding.

When the laser-transmissible resin composition includes no other colorant except for titanium oxide, it exhibits almost the pure white hue having high whiteness degree. The laser-transmissible resin composition may include the laser-transmissible colorant exhibiting any hue such as yellow, red, blue, green and black with titanium oxide. 0.01 to 1.0 parts by weight of the laser-transmissible colorant is included, to 100 parts by weight of the thermoplastic resin.

The composition exhibits the whitish hue by mixing the hue of the colorant and the white hue of titanium oxide in appearance. When the black colorant is included, it exhibits the achromatic color such as gray. When the yellow, red, blue or green colorant having chromatic color is included, it exhibits the tint color called pastel color such as pale yellow or milk-white, pale red, pale blue and pale green.

Examples of the laser-transmissible colorant are known organic dyestuff or pigment such as azo dyestuff or pigment, metallized azo dyestuff or pigment, naphtholazo dyestuff or pigment, azolake dyestuff or pigment, azomethine dyestuff or pigment, anthraquinone dyestuff or pigment, quinacridone dyestuff or pigment, dioxazine dyestuff or pigment, diketopyrrolopyrrole dyestuff or pigment, anthrapyridone dyestuff or pigment, isoindolinone dyestuff or pigment, indanthrone dyestuff or pigment, perinone dyestuff or pigment, perylene dyestuff or pigment, indigo dyestuff or pigment, thioindigo dyestuff or pigment, quinophthalone dyestuff or pigment, quinoline dyestuff or pigment, benzimidazolone dyestuff or pigment and triphenylmethane dyestuff or pigment preferably. The laser-transmissible colorant may be used solely or plurally. Examples of the combination thereof are the green colorant mixing by the yellow colorant and the blue colorant; the violet colorant mixing by the blue colorant and the red colorant; the black colorant mixing by the yellow colorant and the violet colorant.

The laser-transmissible colorant may be commercially available as a master-batch such as eBIND LTW-8170C, -8012, -8620C, -8730C, -8200, -8250C and -8300 that all are available from Orient Chemical Industries, Ltd.

The laser-transmissible resin composition may includes at least one inorganic filler selected from the group consisting of talc, mica, calcium hydrogencarbonate, calcium carbonate, glass fiber, glass flake, glass beads, wollastonite and barium sulfate. The inorganic filler improves molding property and strength in occasion of molding the workpiece out of the composition. It is preferable that 5 to 50 parts by weight of the inorganic filler is included in the composition to 100 parts by weight of the thermoplastic resin. The inorganic filler may be the whitish filler. The glass fiber is more preferable in terms of the laser-transmissible property. It is preferable that length of the glass fiber is in range of 2 to 15 mm and a diameter thereof is in range of 1 to 20 microns. A shape of the glass fiber is not intended to limit. Examples of the shape thereof are roving, milled fiber and so on. The glass fiber is used solely or plurally.

The laser-transmissible resin composition may include flame retarder. The flame retarder may be the organic or inorganic one. Examples thereof are halogen-containing compound such as tetrabromobisphenol A derivative, hexabromodiphenyl ether and tetrabromophthalic anhydride; phosphorus-containing compound such as triphenylphosphate, triphenylphosphite, red phosphorus and ammonium polyphosphate; nitrogen-containing compound such as urea and guanidine; silicon-containing compound such as silicone oil, organic silane and aluminum silicate; antimony compound such as antimony trioxide and antimony phosphate. Especially the organic flame retarder is further preferable. It is preferable that 0.5 to 10 parts by weight of the flame retarder is included in the composition to 100 parts by weight of the thermoplastic resin.

The laser-transmissible resin composition may include other additive agent according to its usage and purpose. Examples thereof are an auxiliary coloring agent, a dispersant, a stabilizer, a plasticizer, a reforming agent, an ultraviolet-absorbent, a light-stabilizer, an antioxidant, an antistatic agent, a lubricant, a mold releasing agent, a crystallization accelerator, a crystalline germ agent, an elastomer for improvement of shock resistance and so on. It is preferable that the 0.1 to 1.0 parts by weight of the additive agent is included to 100 parts by weight of the thermoplastic resin.

Procedures of preparing the laser-transmissible resin composition are as follows. The material components of the thermoplastic resin, titanium oxide and the laser-transmissible colorant or the additive agent if necessary, are combined. They are blended with a mixer such as a blender, a kneader, a Banbury mixer, a roll and an extruder homogeneously, to prepare the powdery composition. Incidentally, blending a part of the material components and then adding and blending of residual part of the material component in order homogeneously may be executed to prepare the composition.

Procedures of preparing the laser-transmissible resin composition may be as follows. The material components are beforehand dry-blended. It is melted, kneaded homogeneously and extruded with a heated extruder to form wire-shape. And then it is cut up to prepare the composition of colored granular pellets having desired length.

Procedures of preparing the laser-transmissible resin composition may be as follows. The thermoplastic resin of the master-batch base resin powder or pellets, titanium oxide, and the laser-transmissible colorant or the additive agent if necessary, are combined with a mixer such as a tumbler and a super-mixer. It is melted, kneaded homogeneously and extruded with an extruder, a batch kneader or a roll kneader to prepare the composition of pellets of the master-batch or rough grains of the master-batch.

Procedures of preparing the laser-transmissible resin composition may be as follows. Titanium oxide, and the laser-transmissible colorant or the additive agent if necessary, is added to liquid base resin for the master-batch synthesized in solvent. Then the solvent is distilled out to prepare the composition as the master-batch.

A laser-transmissible resin workpiece for the laser welding of the present invention is molded out of the laser-transmissible resin composition, and exhibits the opaque whitish hue of white, gray or tint color.

The laser-transmissible resin workpiece having a desired shape is molded out of the laser-transmissible resin composition with a molding machine. Examples of the molding procedure are injection molding, extrusion molding, compression molding, foaming molding, blow molding, vacuum molding, injection blow molding, rotational molding, calendaring molding, solution casting and so on.

The laser-transmissible resin workpiece exhibits the whitish hue. It causes that the laser-transmissible resin composition exhibits the whitish hue.

It is preferable that whiteness degree: $W_1$ of the hue of the laser-transmissible resin workpiece, that determined from the following numerical expression (I) using L-value, a-value and b-value of L*a*b* color specification, is at least 80.

$$W_1 = 100 - \sqrt{(100-L)^2 + (a^2+b^2)} \quad (I)$$

When the whiteness degree is within this range, it causes excellent hiding power. And it looks opaque and exhibits the pretty whitish hue. It is further preferable that the whiteness degree: $W_1$ is 85 to 95.

The laser beam for the laser welding has wavelength ranging from approximate 800 nm of semiconductor laser to approximate 1100 nm of the yttrium aluminum garnet (YAG) laser. And the laser-transmissible resin workpiece, that makes the laser beam transmit at least 15%, is used.

Concretely, it is preferable that the transmissivity is at least 15% under one of wavelengths of 808 nm, 840 nm, 940 nm and 1064 nm. If the transmissivity is less than 15%, the sufficient laser beam of those wavelengths does not transmit. So the strength of the welded workpieces is insufficient, or unusual excess energy of the laser beam is necessary.

A method for laser welding of the present invention is explained with reference to FIG. 1 corresponding to an embodiment. The method for the laser welding comprises:

piling a resin workpiece 2 being at least partly capable of laser-absorption onto the above-mentioned laser-transmissible resin workpiece 1, irradiating the laser beam 3 thereto to weld thermally.

The resin workpiece 2 being at least partly capable of the laser-absorption has the even laser-absorptive property partially or overall.

It is preferable that the resin workpiece 2 being at least portly capable of the laser-absorption is a whitish resin material piece 7 of including a laser absorbent that absorbs the laser beam of the wavelength for the laser welding.

Figure 2:
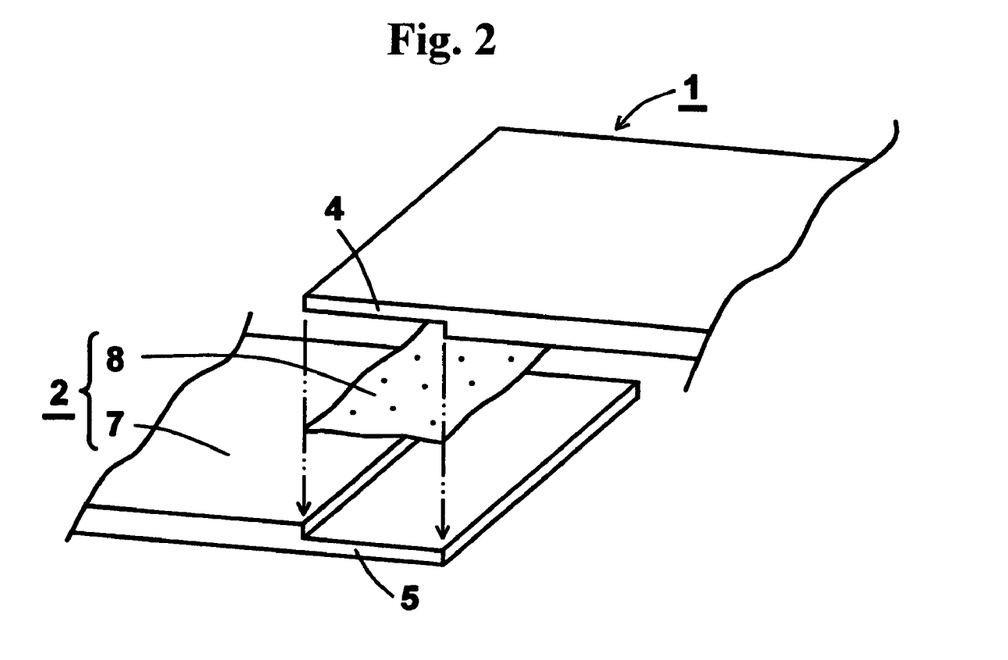
FIG. 2 shows constitution of the laser-transmissible resin workpiece and the laser-absorptive resin workpiece in order to execute the method for the laser welding of the present invention.
Figure 3:
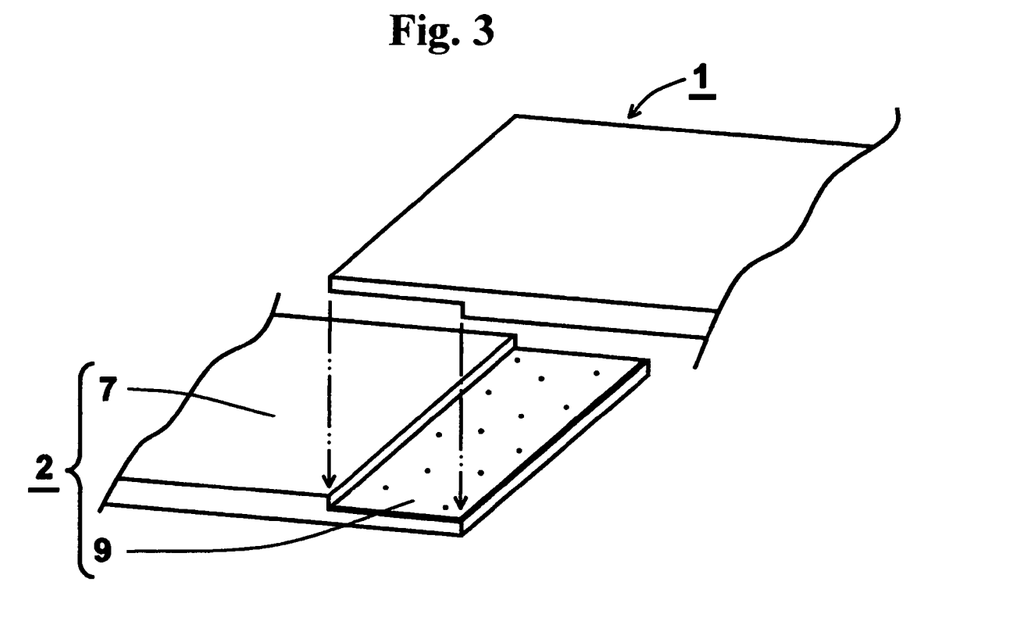
FIG. 3 shows another constitution of the laser-transmissible resin workpiece and the laser-absorptive resin workpiece in order to execute the method for the laser welding of the present invention.

The resin workpiece 2 being at least partly capable of the laser-absorption may be the whitish resin material piece 7 applying a laser-absorptive layer 8 or 9 that includes a laser absorbent absorbing the laser beam of the wavelength for the laser welding, as shown in FIG. 2 and FIG. 3.

Examples of the absorbent are carbon black, nigrosine, aniline black, phthalocyanine, naphthalocyanine, porphyrin, cyanin-type derivative, perylene, quaterrylene, metal complex, azo dyestuff, anthraquinone, square acid derivative, immonium dyestuff and so on. Especially, carbon black and/or nigrosine are preferable because it is economical and very stable.

It is preferable that whiteness degree: $W_2$ of the hue of the whitish resin material piece 7 that constructs the resin workpiece 2 being at least partly capable of the laser-absorption, that determined from the following numerical expression (II) using L-value, a-value and b-value of L*a*b* color specification, is at least 80.

$$W_2 = 100 - \sqrt{(100-L)^2 + (a^2+b^2)} \quad (II)$$

It is further preferable that the whiteness degree: $W_2$ is 85 to 100.

The laser-absorptive layer 8 may be a resin film 8 including the laser absorbent as shown in FIG. 2.

The laser-absorptive layer 9 may be a layer 9 applied by ink and/or paint including the laser absorbent as shown in FIG. 3.

The workpiece molded out of the laser-transmissible resin composition of the present invention includes a proper amount of titanium oxide having suitable particle size and density thereof.

Therefore, although titanium oxide has a property of reflecting the laser beam easily, the whitish laser-transmissible resin workpiece including the above-mentioned titanium oxide transmits the laser beam and is firmly welded by the laser welding. The laser-transmissible resin workpiece exhibiting any hue such as white, gray and tint color that is high whiteness degree, is possible to be prepared. The workpiece makes the laser beam transmit, even if it includes furthermore the filler, the colorant or the flame retarder.

The workpiece exhibiting the whitish hue is opaque, and has excellent hiding property. Furthermore it has satisfactory fastness such as heat resistance and light resistance. And it has excellent migration resistance and chemical resistance.

According to the method for the laser welding of this laser-transmissible resin workpiece and the laser-absorptive resin workpiece, even if they are the elaborate and complicated workpieces, they are joined simply with high airtightness, sufficient strength, high reproducibility and high yield. The whitish workpieces are welded together. Therefore comprehensive products exhibiting the whitish appearance that are finished prettily to accommodate to the demand for customers are obtained.

The method for the laser welding causes no need of contact of the laser beam source and the position of the workpieces being due to weld, exposing to no stress of mechanical vibration, generating of no dust, little thermal influence of periphery by the local exothermic, difficulty of recognizing a boundary line of the welding by visual observation, and pretty finishing.

DETAILED DESCRIPTION OF THE EMBODIMENTS

Hereunder, the embodiments of the present invention are explained in detail.

Figure 1:
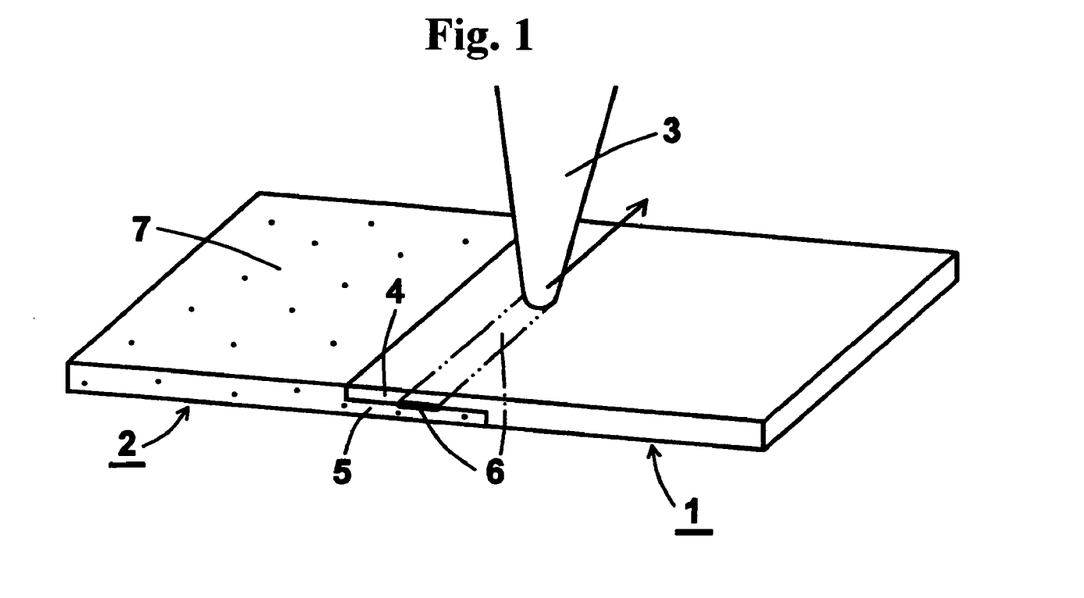
FIG. 1 shows the method for the laser welding of the present invention of both of the laser-transmissible resin workpiece molded out of the laser-transmissible resin composition and the laser-absorptive resin workpiece on its way.

An example of the method for the laser welding of the laser-transmissible resin workpiece 1 molded out of the laser-transmissible resin composition of the present invention and the resin workpiece 2 having the laser-absorption overall is explained referring to FIG. 1.

First of all, the laser-transmissible resin workpiece 1 was prepared as follows. The pellets or powder of the transparent thermoplastic resin, titanium oxide having the density of at least 4 g/cm$^3$ and the average particle size of 100 to 400 nm, and the pulverized additive agent such as the colorant if necessary were homogeneously or heterogeneously mixed with the blender to prepare the laser-transmissible resin composition. The composition was molded by a method such as extrusion molding, injection molding and compression molding to obtain a plate of the laser-transmissible resin workpiece 1 having a stair 4 that lacked half thickness of an under side of one terminal thereof as shown in FIG. 1.

Then the resin workpiece 2 having the laser-absorption overall was prepared as follows. The thermoplastic resin, the laser-absorbent absorbing the laser beam having wavelength for the laser welding, and the additive agent such as the colorant if necessary were mixed with the blender. It was molded by a method such as extrusion molding and injection molding to obtain the plate of the laser-absorptive resin workpiece 2 having a stair 5 that lacked half thickness of an upper side of one terminal thereof as shown in FIG. 1.

The laser welding of them were executed as follows.

As shown in FIG. 1, the stair 4 of the laser-transmissible resin workpiece 1 and the stair 5 of the laser-absorptive resin workpiece 2 were put together. The laser beam 3 was irradiated from above to the upper side of the laser-transmissible resin workpiece 1. A part of the laser beam 3 transmitted through the stair 4 of the laser-transmissible resin workpiece 1, and reached to the stair 5 of the laser-absorptive resin workpiece 2 and was absorbed thereto, to cause exothermic. The laser-transmissible resin workpiece 1 and the laser-absorptive resin workpiece 2 were melted by the exothermic to fuse them. After cooling, the laser-transmissible resin workpiece 1 and the laser-absorptive resin workpiece 2 were firmly joined with sufficient welding strength at a welded position 6 thereof.

Though the method for the laser welding shown in FIG. 1 is explained above, incidentally it may be the following method as shown in FIG. 2. The laser welding of the laser-transmissible resin workpiece 1 molded out of the laser-transmissible resin composition of the present invention and the resin workpiece 2 being partly capable of the laser-absorption by the laser-absorptive layer 8 of the resin film including the laser absorbent is executed.

Concretely it is as follows. First of all, the laser-transmissible resin workpiece 1 was prepared as same as the above.

The thermoplastic resin and the additive agent such as the laser-absorbent and the colorant if necessary were mixed with the blender. It was molded by a method such as extrusion molding and injection molding to obtain the plate of the whitish resin material piece 7 having the stair 5. The whitish resin material piece 7 may or may not include the laser-absorbent. It is unnecessary to consider that the whitish resin material piece 7 has the laser-absorptive property or not. The thermoplastic resin, the laser-absorbent absorbing the laser beam having the wavelength for the laser welding, and the additive agent if necessary were mixed with the blender. It was molded by the method such as extrusion molding and injection molding to obtain the laser-absorptive layer of the resin film 8 having preferably the thickness of 0.1 mm or less. When the resin film 8 was piled onto the stair 5 of the whitish resin material piece 7, the resin workpiece 2 being partly capable of the laser-absorption by the laser-absorptive layer was obtained. The resin film 8 such as a film including carbon black improves efficiency of absorbing the laser beam. And the resin workpiece 1 and the resin workpiece 2 having the resin film 8 were joined through the resin film 8 firmly. The stair 4 of the laser-transmissible resin workpiece 1 and the stair 5 of the laser-absorptive resin workpiece 2 were put together as same as FIG. 1. Then the laser beam 3 was irradiated to join them through the resin film 8.

It may be the following method, as shown in FIG. 3. The laser-transmissible resin workpiece 1 was molded out of the laser-transmissible resin composition of the present invention. The ink or the paint including the laser-absorbent was applied onto the stair 5 of the whitish resin material piece 7 to obtain the resin workpiece 2 being partly capable of the laser-absorption having the laser-absorptive layer 9. The laser welding of the laser-transmissible resin workpiece 1 and the resin workpiece 2 being partly capable of the laser-absorption was executed.

It may be the following method. Beforehand the ink or the paint was applied onto the stair 4 of the laser-transmissible resin workpiece 1 to prepare the laser-absorptive layer 9. Then it was put onto the stair 5 of the whitish resin piece material 7 to prepare the combination of the resin workpiece 2 being partly capable of the laser-absorption and the laser-transmissible resin workpiece 1. The laser welding of them was executed.

The laser-absorptive layer 9 applied by the ink of the paint can fix onto the surface of the resin workpiece 1 or 2 simply and certainly. It has thin thickness thereof and high absorption coefficient of the laser beam. Applying thereof is executed by an arbitrary applying procedure such as spraying, coating with a marking pen, a painting brush, a writing brush and so on.

The ink or the paint improves efficiency of absorbing the laser beam. The ink or the paint joins the resin workpiece 1 and the resin workpiece 2 as similar as the occasion of the resin workpiece 2 having the resin film 8. The ink or the paint is unified at the welded position 6 as referring to FIG. 1. The ink or the paint consist of the composition including the laser-absorbent such as black laser-absorptive pigment illustrated by carbon black, aniline black and nigrosine; laser-absorptive compound such as anthraquinone derivative, phthalocyanine derivative, cyanin derivative and metal complex.

It is preferable that a principal solvent in the ink and/or the paint is an alcohol solvent or a glycol solvent. Examples of the solvent are monohydric alcohol and dihydric alcohol. Concrete examples of monohydric alcohol are alcohol such as ethanol, n-propanol, isopropanol, n-butanol, amyl alcohol, benzyl alcohol, cyclohexanol and diacetone alcohol; glycol alkyl ether such as ethylene glycol monomethyl ether, ethylene glycol monoethyl ether, propylene glycol monomethyl ether, propylene glycol monoethyl ether, diethylene glycol monoethyl ether, diethylene glycol monobutyl ether and dipropylene glycol monoethyl ether; glycol acetate such as ethylene glycol monoacetate and propylene glycol monoacetate. Concrete examples of dihydric alcohol are glycol such as ethylene glycol, diethylene glycol, triethylene glycol, tetraethylene glycol, polyethylene glycol, propylene glycol and butanediol.

The ink and/or the paint may include various additive agents such as a soluble resin, a dispersive resin, colorant, a dispersant, a solubility stabilizer, an antiseptics and a light stabilizer in response to the use and the purpose, except for an interfering agent of the laser welding of the resin workpieces.

In occasion of the laser welding of using the resin workpiece 2 being partly capable of the laser-absorption, the laser-transmissible resin workpiece 1 hides the laser-absorptive layer 8 or 9 to be invisible as shown in FIG. 2 or 3. Therefore the whitish resin workpiece 1 and the whitish resin material piece 7 that constructs the resin workpiece 2 may have the same hue. The neighborhood of the welded position has no feeling of incongruity and looks pretty. The resin workpieces 1 and 2 having any whitish hue can execute the laser welding suitably.

The resin workpiece 2 being capable of the laser-absorption partly or overall as shown in FIG. 1, 2, or 3, may include the component as similar as the laser-transmissible composition includes. Examples of the component are the thermoplastic resin, titanium oxide, and the additive agent such as the colorant, the filler and the flame retarder. Examples of the supplementary component in according to its usage and purpose are the auxiliary coloring agent, the dispersant, the stabilizer, the plasticizer, the reforming agent, the ultraviolet-absorbent, the light-stabilizer, the antioxidant, the antistatic agent, the lubricant, the mold releasing agent, the crystallization accelerator, the crystalline germ agent, the elastomer for improvement of shock resistance and so on. And more example of the supplementary component is another additive agent having the low laser-transmissible property.

The laser-transmissible resin workpiece and the laser-absorptive resin workpiece may be molded using the same or different resin.

Hereunder, manufacturing examples applying the present invention of the test piece as the laser-transmissible resin workpiece 1, that are manufactured molding the prepared laser-transmissible resin composition, are explained. And comparative manufacturing examples not applying the present invention are explained.

Manufacturing Example 1

Trial Manufacturing of a Test Piece (A) as the Laser-Transmissible Resin Workpiece 1000 g of the polypropylene resin of catalog No. BC05B that is available from Japan Polychem Co., Ltd. and 3 g of titanium oxide having the average particle size of 210 nm and the density of 4.1 g/cm$^3$ thereof treated on the surface thereof by aluminum were added in a tumbler made of stainless steel, and mixed with stirring for 1 hour to prepare the laser-transmissible resin composition. The obtained composition was executed by injection molding at 220 degrees Centigrade of temperature of a cylinder and 40 degrees Centigrade of temperature of a metal mold with general procedures using an injection molding machine of catalog No. Si-50 that is available from Toyo Machinery & Metal Co., Ltd. to manufacture the test piece (A) of the plate as the laser-transmissible resin workpiece 1 having length of 70 mm, width of 18 mm and thickness of 4 mm with the proviso of the end portion having the stair 4 of thickness of 2 mm and length of 20 mm from the edge by lacking the under side thereof as shown in FIG. 1. The surface and the appearance thereof were glossy, regular and exhibited the hue of white uniformly. As regards the refractive index, $n_1-n_2=1.24$ and $n_2=1.5$.

Manufacturing Examples 2 TO 4

Trial Manufacturing of Test Pieces (B), (C) and (D) as the Laser-Transmissible Resin Workpiece The procedures were executed as same as Manufacturing Example 1 except for using 6 g of the same titanium oxide of Manufacturing Example 1 under Manufacturing Example 2; 3 g of titanium oxide having the average particle size of 250 nm and the density of 4.0 g/cm$^3$ thereof treated on the surface thereof by aluminum-silicon under Manufacturing Example 3; and 3 g of untreated titanium oxide having the average particle size of 270 nm and the density of 4.2 g/cm$^3$ thereof under Manufacturing Example 4; instead of specified titanium oxide of Manufacturing Example 1 to manufacture the test pieces (B), (C) and (D) as the laser-transmissible resin workpiece 1. The surface and the appearance thereof were glossy, regular and exhibited the hue of white uniformly.

Comparative Manufacturing Example 1

A Comparative Test Piece (A) as the Laser-Transmissible Resin Workpiece 1000 g of the polypropylene resin of catalog No. BC05B that is available from Japan Polychem Co., Ltd. and 0.7 g of titanium oxide having the average particle size of 210 nm and the density of 4.1 g/cm$^3$ thereof treated on the surface thereof by aluminum were added in the tumbler made of stainless steel, and mixed with stirring for 1 hour to prepare the composition of the comparative example. The obtained composition was executed by injection molding at 220 degrees Centigrade of temperature of the cylinder and 40 degrees Centigrade of temperature of the metal mold with the general procedures using the injection molding machine of catalog No. Si-50 that is available from Toyo Machinery & Metal Co., Ltd. to manufacture the comparative test piece (A) of the plate as the laser-transmissible resin workpiece having the length of 70 mm, the width of 18 mm and the thickness of 4 mm with the proviso of the end portion having the stair of the thickness of 2 mm and the length of 20 mm from the edge by lacking the under side thereof as shown in FIG. 1.

Comparative Manufacturing Example 2

A Comparative Test Piece (B) as the Laser-Transmissible Resin Workpiece

The procedures were executed as same as Comparative Manufacturing Example 1 except for using 48 g of the same titanium oxide of Comparative Manufacturing Example 1 to manufacture the comparative test piece (B) as the white laser-transmissible resin workpiece.

Comparative Manufacturing Example 3

A Comparative Test Piece (C) as the Laser-Transmissible Resin Workpiece

The procedures were executed as same as Comparative Manufacturing Example 1 except for using 24 g of untreated titanium oxide having the density of 4.0 g/cm³ and the average particle size of 15 nm thereof to manufacture the comparative test piece (C) as the white laser-transmissible resin workpiece.

Comparative Manufacturing Example 4

A Comparative Test Piece (D) as the Laser-Transmissible Resin Workpiece

The procedures were executed as same as Comparative Manufacturing Example 1 except for using 24 g of untreated titanium oxide having the density of 3.9 g/cm³ and the average particle size of 180 nm thereof to manufacture the comparative test piece (D) as the white laser-transmissible resin workpiece.

The determination of the transmissivity, the determination of the whiteness degree and the observation of the hue of the manufactured test pieces made in the above-mentioned Manufacturing Examples and the manufactured comparative test pieces made in the above-mentioned Comparative Manufacturing Examples were evaluated physically.

(Determination of the Transmissivity)

Each of the manufactured test pieces or the comparative test pieces was set up onto a spectrophotometer of catalog No. V-570 that is available from JASCO Corporation. The transmissivity of the portion with the thickness of 2 mm of the stair 4 of the test piece or the comparative test piece that is shown in FIG. 1 was determined under the wavelength λ ranging from 400 to 1200 nm of the irradiated laser beam. The results of the transmissivity thereof under the wavelength of 808 nm of the semiconductor laser are shown in Table 1.

(Determination of the Whiteness Degree)

The L-value, a-value and b-value of L*a*b* color specification at the portion with the thickness of 2 mm of the stair 4 of the test piece or the comparative test piece that is shown in FIG. 1 was determined by a color difference meter of catalog No. JP7000 that is available from JUKI Corporation. The whiteness degree: $W_1$ was calculated by the following expression (I).

$$W_1 = 100 - \sqrt{(100-L)^2 + (a^2 + b^2)} \quad (I)$$

The results are shown in Table 1.

(Observation of the Hue)

The hue of each of the test pieces of Manufacturing Examples and the comparative test pieces of Comparative Manufacturing Examples was observed by visual observation. The results are shown in Table 1.

TABLE 1

| Test Piece | | Transmissivity (%) | Whiteness Degree: $W_1$ | Hue |
|---|---|---|---|---|
| Manufacturing Example 1 | Test Piece(A) | 32 | 87 | White |
| Manufacturing Example 2 | Test Piece(B) | 21 | 90 | White |
| Manufacturing Example 3 | Test Piece(C) | 29 | 84 | White |
| Manufacturing Example 4 | Test Piece(D) | 30 | 83 | White |
| Comparative Manufacturing Example 1 | Comparative Test Piece(A) | 40 | 74 | White |
| Comparative Manufacturing Example 2 | Comparative Test Piece(B) | 5 | 93 | White |
| Comparative Manufacturing Example 3 | Comparative Test Piece(C) | 42 | 65 | Pale Yellowish White |
| Comparative Manufacturing Example 4 | Comparative Test Piece(D) | 12 | 82 | White |
| Polypropylene Resin, Used in Manufacturing Examples 1 to 4 and Comparative Manufacturing Examples 1 to 4 | | 45 | 60 | |

Manufacturing Example 5

Trial Manufacturing of Test Piece (E) as the Laser-Transmissible Resin Workpiece The procedures were executed as same as Manufacturing Example 1 except for using 1000 g of the polypropylene resin including the glass fiber of catalog No. HG30U that is available from Japan Polychem Co., Ltd. and 6 g of titanium oxide having the average particle size of 210 nm and the density of 4.1 g/cm³ thereof treated on the surface thereof by aluminum instead of specified titanium oxide and the polypropylene resin of Manufacturing Example 1 to manufacture the test piece (E) as the laser-transmissible resin workpiece 1. The surface and the appearance thereof were glossy, regular and exhibited the hue of white uniformly. As regards the refractive index, $n_1 - n_2 = 1.19$ and $n_2 = 1.57$.

Comparative Manufacturing Examples 5 to 6

Trial Manufacturing of a Comparative Test Pieces (E) and (F) as the Laser-Transmissible Resin Workpiece The procedures were executed as same as Manufacturing Example 5 except for using 1000 g of the polypropylene resin including the glass fiber of catalog No. HG30U and 12 g of untreated titanium oxide having the density of 4.0 g/cm³ and the average particle size of 15 nm thereof under Comparative Manufacturing Example 5 instead of specified titanium oxide and the polypropylene resin including the glass fiber of Manufacturing Example 5; 1000 g of the polypropylene resin including the glass fiber of catalog No. HG30U and 36 g of titanium oxide having the average particle size of 210 nm and the density of 4.1 g/cm³ and treated on the surface thereof by aluminum under Comparative Manufacturing Example 6 instead of specified titanium oxide and the polypropylene resin including the glass fiber of Manufacturing Example 5; to manufacture the comparative test pieces (E) and (F). The comparative test piece (E) was translucent and regular, and exhibited the hue of white uniformly. The comparative test piece (F) was opaque and regular, and exhibited the hue of white uniformly. The results are shown in Table 2.

TABLE 2

| Test Piece | | Transmissivity (%) | Whiteness Degree: $W_1$ | Hue |
|---|---|---|---|---|
| Manufacturing Example 5 | Test Piece(E) | 16 | 88 | White |
| Comparative Manufacturing Example 5 | Comparative Test Piece(E) | 39 | 70 | White |
| Comparative Manufacturing Example 6 | Comparative Test Piece(F) | 8 | 91 | White |
| Polypropylene Resin including Glass Fiber, Used in Manufacturing Example 5 and Comparative Manufacturing Examples 5 to 6 | | 41 | 64 | |

Manufacturing Example 6

Trial Manufacturing of a Test Piece (F) as the Laser-Transmissible Resin Workpiece The procedures were executed as same as Manufacturing Example 1 except for using 6 g of titanium oxide having the average particle size of 210 nm and the density of 4.1 g/cm³ thereof treated on the surface thereof by aluminum and 1 g of the master-batch of the laser-transmissible colorant of catalog No. eBIND LTW-8170 that is available from Orient Chemical Industries, Ltd. instead of specified titanium oxide of Manufacturing Example 1 to manufacture the test piece (F) as the laser-transmissible resin workpiece 1. The surface and the appearance thereof were glossy, regular and exhibited the hue of reddish gray uniformly.

Comparative Manufacturing Example 7

Trial Manufacturing of a Comparative Test Piece (G) as the Laser-Transmissible Resin Workpiece The procedures were executed as same as Manufacturing Example 6 except for using 12 g of untreated titanium oxide having the density of 4.0 g/cm³ and the average particle size of 15 nm thereof and 1.0 g of the master-batch of the laser-transmissible colorant of catalog No. eBIND LTW-8170 that is available from Orient Chemical Industries, Ltd. instead of specified titanium oxide and the master-batch of the laser-transmissible colorant of Manufacturing Example 6 to manufacture the comparative test piece (G). The comparative test piece (G) was translucent and regular, and exhibited the hue of reddish gray uniformly.

Manufacturing Examples 7 to 8

Trial Manufacturing of Test Pieces (G) and (H) as the Laser-Transmissible Resin Workpiece The procedures were executed as same as Manufacturing Example 1 except for using 3 g of titanium oxide having the average particle size of 210 nm and the density of 4.1 g/cm³ thereof treated on the surface thereof by aluminum and 0.03 g of the colorant of catalog No. Nubian Red ES-1301 that is available from Orient Chemical Industries, Ltd. under Manufacturing Example 7; 3 g of titanium oxide having the average particle size of 210 nm and the density of 4.1 g/cm³ thereof treated on the surface thereof by aluminum and 0.03 g of the colorant of catalog No. Nubian Red ES-5301 that is available from Orient Chemical Industries, Ltd. under Manufacturing Example 8 instead of specified titanium oxide of Manufacturing Example 1 to manufacture the test pieces (G) and (H) as the laser-transmissible resin workpiece 1. The surface and the appearance thereof were glossy, regular and exhibited the hue of pale red uniformly.

The determination of the transmissivity, the determination of the whiteness degree and the observation of the hue of the test pieces and the comparative test pieces were evaluated physically as same as the above. The results are shown in Table 3.

TABLE 3

| | Test Piece | Transmissivity (%) | Whiteness Degree: $W_1$ | Hue |
|---|---|---|---|---|
| Manufacturing Example 6 | Test Piece(F) | 22 | 72 | Reddish Gray |
| Comparative Manufacturing Example 7 | Comparative Test Piece(G) | 38 | 53 | Reddish Gray |
| Manufacturing Example 7 | Test Piece(G) | 32 | 78 | Pale Red |
| Manufacturing Example 8 | Test Piece(H) | 31 | 80 | Pale Red |
| Polypropylene Resin, Used in Manufacturing Examples 6 to 8 | | 45 | 60 | |

Manufacturing Example 9

Trial Manufacturing of a Test Piece (I) as the Laser-Transmissible Resin Workpiece 1000 g of the polycarbonate resin of catalog No. LEXAN 1000, Flame-retardancy grade: V-0 that is available from Japan G. E. Plastics and 3 g of titanium oxide having the average particle size of 210 nm and the density of 4.1 g/cm³ thereof treated on the surface thereof by aluminum were added in the tumbler made of stainless steel, and mixed with stirring for 1 hour to prepare the laser-transmissible resin composition. The obtained composition was executed by injection molding at 290 degrees Centigrade of temperature of the cylinder and 80 degrees Centigrade of temperature of the metal mold with general procedures using the injection molding machine of catalog No. Si-50 that is available from Toyo Machinery & Metal Co., Ltd. to manufacture the test piece (I) of the plate having the length of 70 mm, the width of 18 mm and the thickness of 4 mm with the proviso of the end portion having the stair 4 of the thickness of 2 mm and the length of 20 mm from the edge by lacking the under side thereof as shown in FIG. 1. The surface and the appearance thereof were glossy, regular and exhibited the hue of white uniformly. As regards the refractive index, $n_1-n_2=1.17$ and $n_2=1.59$.

Comparative Manufacturing Examples 8 to 9

Trial Manufacturing Of Comparative Test Pieces (H) and (I) as the Laser-Transmissible Resin Workpiece The procedures were executed as same as Manufacturing Example 9 except for using 1000 g of the polycarbonate resin of catalog No. LEXAN 1000 and 12 g of untreated titanium oxide having the density of 4.0 g/cm³ and the average particle size of 15 nm thereof under Comparative Manufacturing Example 8 instead of specified titanium oxide and the polycarbonate resin of Manufacturing Example 9; 1000 g of the polycarbonate resin of catalog No. LEXAN 1000 and 36 g of titanium oxide having the average particle size of 210 nm and the density of 4.1 g/cm$^3$ thereof treated on the surface thereof by aluminum under Comparative Manufacturing Example 9 instead of specified titanium oxide and the polycarbonate resin of Manufacturing Example 9; to manufacture the comparative test pieces (H) and (I). The comparative test piece (H) was translucent and regular, and exhibited the hue of white uniformly. The comparative test piece (I) was opaque and regular, and exhibited the hue of white uniformly.

Manufacturing Example 10

Trial Manufacturing of Test Piece (J) as the Laser-Transmissible Resin Workpiece The procedures were executed as same as Manufacturing Example 9 except for using 1000 g of the polycarbonate resin of catalog No. LEXAN 1000, Flame-retardancy grade: V-0 that is available from Japan G. E. Plastics, 3 g of titanium oxide having the average particle size of 210 nm and the density of 4.1 g/cm$^3$ thereof treated on the surface thereof by aluminum and 1 g of the master-batch of the laser-transmissible colorant of catalog No. eBIND LTW-8300 that is available from Orient Chemical Industries, Ltd. instead of specified titanium oxide and the polycarbonate resin of Manufacturing Example 9 to manufacture the test piece (J) as the laser-transmissible resin workpiece 1. The surface and the appearance thereof were glossy, regular and exhibited the hue of reddish gray uniformly.

Comparative Manufacturing Example 10

Trial Manufacturing of a Comparative Test Piece (J) as the Laser-Transmissible Resin Workpiece The procedures were executed as same as Manufacturing Example 10 except for using 12 g of untreated titanium oxide having the density of 4.0 g/cm$^3$ and the average particle size of 15 nm thereof and 1 g of the master-batch of the laser-transmissible colorant of catalog No. eBIND LTW-8300 that is available from Orient Chemical Industries, Ltd. instead of specified titanium oxide and the master-batch of the laser-transmissible colorant of Manufacturing Example 10 to manufacture the comparative test piece (J). The comparative test piece (J) was translucent and regular, and exhibited the hue of reddish gray uniformly.

The determination of the transmissivity, the determination of the whiteness degree and the observation of the hue of the test pieces and the comparative test pieces were evaluated physically as same as the above. The results are shown in Table 4.

TABLE 4

| Test Piece | | Transmissivity (%) | Whiteness Degree: $W_1$ | Hue |
|---|---|---|---|---|
| Manufacturing Example 9 | Test Piece(I) | 26 | 84 | White |
| Comparative Manufacturing Example 8 | Comparative Test Piece(H) | 32 | 70 | White |
| Comparative Manufacturing Example 9 | Comparative Test Piece(I) | 7 | 94 | White |
| Manufacturing Example 10 | Test Piece(J) | 22 | 55 | Reddish Gray |

TABLE 4-continued

| Test Piece | | Transmissivity (%) | Whiteness Degree: $W_1$ | Hue |
|---|---|---|---|---|
| Comparative Manufacturing Example 10 | Comparative Test Piece(J) | 27 | 42 | Reddish Gray |
| Polycarbonate Resin (Flame-retardancy Grade); Used in Manufacturing Examples 9 to 10 and Comparative Manufacturing Examples 8 to 10 | | 35 | 74 | |

Manufacturing Example 11

Trial Manufacturing of a Test Piece (K) as the Laser-Transmissible Resin Workpiece 1000 g of the polyamide 66 resin of catalog No. ZYTEL101 that is available from Du Pont and 3 g of titanium oxide having the average particle size of 210 nm and the density of 4.1 g/cm$^3$ thereof treated on the surface thereof by aluminum were added in the tumbler made of stainless steel, and mixed with stirring for 1 hour to prepare the laser-transmissible resin composition. The obtained composition was executed by injection molding at 280 degrees Centigrade of temperature of the cylinder and 60 degrees Centigrade of temperature of the metal mold with general procedures using the injection molding machine of catalog No. Si-50 that is available from Toyo Machinery & Metal Co., Ltd. to manufacture the test piece (K) of the plate having the length of 70 mm, the width of 18 mm and the thickness of 4 mm with the proviso of the end portion having the stair 4 of the thickness of 2 mm and the length of 20 mm from the edge by lacking the under side thereof as shown in FIG. 2. The surface and the appearance thereof were glossy, regular and exhibited the hue of white uniformly.

Comparative Manufacturing Example 11

Trial Manufacturing of a Comparative Test Piece (K) as the Laser-Transmissible Resin Workpiece The procedures were executed as same as Manufacturing Example 10 except for using 12 g of untreated titanium oxide having the density of 4.0 g/cm$^3$ and the average particle size of 15 nm of thereof instead specified titanium oxide of Manufacturing Example 10 to manufacture the comparative test piece (K) as the laser-transmissible resin workpiece 1. The comparative test piece (K) was translucent and regular, and exhibited the hue of white uniformly.

The results are shown in Table 5.

TABLE 5

| Test Piece | | Transmissivity (%) | Whiteness Degree: $W_1$ | Hue |
|---|---|---|---|---|
| Manufacturing Example 11 | Test Piece(K) | 21 | 90 | White |
| Comparative Manufacturing Example 11 | Comparative Test Piece(K) | 62 | 74 | White |
| Polyamide Resin; Used in Manufacturing Example 11 and Comparative Manufacturing Example 11 | | 68 | 55 | |

Hereunder, manufacturing examples of the test piece as the white laser-absorptive resin workpiece 2 are explained.

Manufacturing Example 12

A Test Piece (a) as the Resin Piece 400 g of the polypropylene resin of catalog No. BC05B that is available from Japan Polychem Co., Ltd. and 19.2 g of titanium oxide having the average particle size of 210 nm and the density of 4.1 g/cm$^3$ thereof treated on the surface thereof by aluminum were added in the tumbler made of stainless steel, and mixed with stirring for 1 hour to prepare the resin composition. The obtained composition was executed by injection molding at 220 degrees Centigrade of temperature of the cylinder and 40 degrees Centigrade of temperature of the metal mold with general procedures using the injection molding machine of catalog No. Si-50 that is available from Toyo Machinery & Metal Co., Ltd. to manufacture the test piece (a) of the plate as the workpiece 2 having the length of 70 mm, the width of 18 mm and the thickness of 4 mm with the proviso of the end portion having the stair 5 of the thickness of 2 mm. and the length of 20 mm from the edge by lacking the upper side thereof as shown in FIG. 1. The surface and the appearance thereof were glossy, regular and exhibited the hue of white uniformly.

Manufacturing Example 13

A Test Piece (b) as the Resin Piece Including More Amount of Titanium Oxide than that of Claim 1 without the Laser-Absorbent 400 g of the polycarbonate resin of catalog No. LEXAN 1000 and 19.2 g of titanium oxide having the average particle size of 210 nm and the density of 4.1 g/cm$^3$ thereof treated on the surface thereof by aluminum were added in the tumbler made of stainless steel, and mixed with stirring for 1 hour to prepare the resin composition. The obtained composition was executed by injection molding at 290 degrees Centigrade of temperature of the cylinder and 80 degrees Centigrade of temperature of the metal mold with general procedures using the injection molding machine of catalog No. Si-50 that is available from Toyo Machinery & Metal Co., Ltd. to manufacture the test piece (b) of the plate as the workpiece 2 having the length of 70 mm, the width of 18 mm and the thickness of 4 mm with the proviso of the end portion having the stair 5 of the thickness of 2 mm and the length of 20 mm from the edge by lacking the upper side thereof as shown in FIG. 1. The surface and the appearance thereof were glossy, regular and exhibited the hue of white uniformly.

Manufacturing Example 14

A Test Piece (L) as the Laser-Absorptive Resin Workpiece 400 g of the polypropylene resin of catalog No. BC05B that is available from Japan Polychem Co., Ltd., 19.2 g of titanium oxide having the average particle size of 210 nm and the density of 4.1 g/cm$^3$ thereof treated on the surface thereof by aluminum and 0.4 g of carbon black of catalog No. CB960 that is available from Mitsubishi Chemical Corporation were added in the tumbler made of stainless steel, and mixed with stirring for 1 hour to prepare the resin composition. The obtained composition was executed by injection molding at 220 degrees Centigrade of temperature of the cylinder and 40 degrees Centigrade of temperature of the metal mold with general procedures using the injection molding machine of catalog No. Si-50 that is available from Toyo Machinery & Metal Co., Ltd. to manufacture the test piece (L) of the plate as the workpiece 2 having the length of 70 mm, the width of 18 mm and the thickness of 4 mm with the proviso of the end portion having the stair 5 of the thickness of 2 mm and the length of 20 mm from the edge by locking the upper side thereof as shown in FIG. 1. The surface and the appearance thereof were glossy, regular and exhibited the hue of gray uniformly.

The results are shown in Table 6.

TABLE 6

| | Laser-absorptive Rein Workpiece | | |
|---|---|---|---|
| Test Piece | Transmissivity (%) | Whiteness Degree: W$_2$ | Hue |
| Manufacturing Example 14 Test Piece(L) | 0 | 34 | Gray |

Manufacturing Example 15

A Test Piece (M) as the Laser-Absorptive Resin Workpiece 400 g of the polypropylene resin of catalog No. BC05B that is available from Japan Polychem Co., Ltd., 0.5 g of nigrosine of catalog No. nigrosine base EX that is available from Orient Chemical Industries, Ltd. and 0.3 g of carbon black of catalog No. CB960 that is available from Mitsubishi Chemical Corporation were added in the tumbler made of stainless steel, and mixed with stirring for 1 hour to prepare the resin composition. The obtained composition was executed by injection molding at 220 degrees Centigrade of temperature of the cylinder and 40 degrees Centigrade of temperature of the metal mold with general procedures using the injection molding machine of catalog No. Si-50 that is available from Toyo Machinery & Metal Co., Ltd. to manufacture the test piece (M) of the plate as the laser-absorptive resin workpiece 2 having the length of 70 mm, the width of 18 mm and the thickness of 4 mm with the proviso of the end portion having the stair 5 of the thickness of 2 mm and the length of 20 mm from the edge by lacking the upper side thereof as shown in FIG. 1. The transmissivity thereof is 0%. The surface and the appearance thereof were glossy, regular and exhibited the hue of black uniformly.

In following Manufacturing Examples 16 to 20, test pieces (N), (O), (P), (O) and (R) as the laser-absorptive resin workpiece 2 having the laser-absorptive layer 8 of the resin film including carbon black, were manufactured.

Manufacturing Examples 16 to 20

Trial Manufacturing of Test Pieces (N), (O), (P), (O) and (R) as the Laser-Absorptive Resin Workpiece 400 g of the polypropylene resin of catalog No. BC05B that is available from Japan Polychem Co., Ltd. and 0.8 g of carbon black of catalog No. CB960 that is available from Mitsubishi Chemical Corporation were added in the tumbler made of stainless steel, and mixed with stirring for 1 hour to prepare the resin composition. The obtained composition was executed by extrusion molding at 220 degrees Centigrade of temperature of the cylinder and 40 degrees Centigrade of temperature of the metal mold with general procedures using the molding machine of catalog No. Si-50 that is available from Toyo Machinery & Metal Co., Ltd. that replace a die for thin resin film to manufacture the resin film including carbon black.

As shown in FIG. 2, the film was piled onto the stair 5 of the test piece obtained in the above-mentioned Manufacturing Example to manufacture the test piece as the laser-absorptive resin workpiece 2.

The test pieces as the laser-absorptive resin workpiece combined were obtained as follows.

The test piece (N) in Manufacturing Example 16 was obtained by combining of the resin film including carbon black and the prepared test piece (a) as the resin piece.

The test piece (O) in Manufacturing Example 17 was obtained by combining of the resin film including carbon black and the prepared test piece (b) as the resin piece.

The test piece (P) in Manufacturing Example 18 was obtained by combining of the resin film including carbon black and the prepared test piece (E) as the laser-transmissible resin workpiece.

The test piece (Q) in Manufacturing Example 19 was obtained by combining of the resin film including carbon black and the prepared test piece (I) as the laser-transmissible resin workpiece.

The test piece (R) in Manufacturing Example 20 was obtained by combining of the resin film including carbon black and the prepared test piece (F) as the laser-transmissible resin workpiece.

In following Manufacturing Examples 21 to 25, the ink for marker including alcohol and the laser-absorbent was prepared, and then it was applied onto the above-mentioned test piece (R) to manufacture test pieces (S), (T), (U), (V) and (W) as the laser-absorptive resin workpiece 2 having the laser-absorptive layer 9.

Manufacturing Examples 21 to 25

Trial Manufacturing of a Test Pieces (S), (T), (U), (V) and (W) as the Laser-Absorptive Resin Workpiece 6 parts by weight of nigrosine base EX
69 parts by weight of ethanol
5 parts by weight of benzyl alcohol
10 parts by weight of oleic acid
10 parts by weight of ketone resin The above compounds were mixed and dissolved at 40 degrees Centigrade homogeneously to prepare the ink.

The elapse stability test of the ink was executed by keeping in a low/high temperature bath of catalog No. INCUBATOR that is available from Sanyo Electric Co., Ltd. It is recognized that the dyestuff did not deposit, and viscosity thereof did not increase after 3 months keeping.

The ink was filled up in shell of the marking pen. Generally the ink was applied onto the stair 5 of the above-mentioned test piece for the resin workpiece as shown in FIG. 3, to manufacture the uniform and pretty test piece as the laser-absorptive resin workpiece 2 having the laser-absorptive layer 9.

The test piece (S) in Manufacturing Example 21 was obtained by applying the ink for marking onto the prepared test piece (a) of the resin piece.

The test piece (T) in Manufacturing Example 22 was obtained by applying the ink for marking onto the prepared test piece (b) of the resin piece.

The test piece (U) in Manufacturing Example 23 was obtained by applying the ink for marking onto the prepared test piece (A) of the laser-transmissible resin workpiece.

The test piece (V) in Manufacturing Example 24 was obtained by applying the ink for marking onto the prepared test piece (I) of the laser-transmissible resin workpiece.

The test piece (W) in Manufacturing Example 25 was obtained by applying the ink for marking onto the prepared test piece (G) of the laser-transmissible resin workpiece.

And the test piece (X) in Manufacturing Example 26 was obtained by applying the ink for marking onto the prepared test piece (K) of the laser-transmissible resin workpiece.

The determination of the transmissivity, the determination of the calculated whiteness degree $W_2$ and the observation of the hue of the manufactured test piece as the laser-absorptive rein workpiece of Manufacturing Examples were evaluated physically.

The results are shown in Table 7.

TABLE 7

Laser-absorptive Rein Workpieces

| Test Piece | | Transmissivity (%) | Whiteness Degree: $W_2$ | Hue |
|---|---|---|---|---|
| Manufacturing Example 16 | Test Piece(N) | 4 | 92 | White |
| Manufacturing Example 17 | Test Piece(O) | 1 | 92 | White |
| Manufacturing Example 18 | Test Piece(P) | 1 | 88 | White |
| Manufacturing Example 19 | Test Piece(Q) | 3 | 84 | White |
| Manufacturing Example 20 | Test Piece(R) | 2 | 72 | Reddish Gray |
| Manufacturing Example 21 | Test Piece(S) | 7 | 92 | White |
| Manufacturing Example 22 | Test Piece(T) | 3 | 92 | White |
| Manufacturing Example 23 | Test Piece(U) | 7 | 87 | Gray |
| Manufacturing Example 24 | Test Piece(V) | 5 | 84 | White |
| Manufacturing Example 25 | Test Piece(W) | 5 | 34 | Pale Red |

The laser welding tests using the test pieces or the comparative test pieces as the laser-transmissible resin workpiece and the test pieces as the laser-absorptive resin workpiece that were all made in Manufacturing Examples or Comparative Manufacturing Examples were executed as follows. Tensile strength tests thereof were executed and the welding properties thereof were evaluated.

The laser welding of the combination of the test pieces or the comparative test pieces as the laser-transmissible resin workpiece and the test pieces as the laser-absorptive resin workpiece according to mention in Table 8 was executed.

As shown in FIG. 1, the stair 5 of the test piece as the laser-absorptive resin workpiece 2 and the stair 4 of the test piece as the laser-transmissible resin workpiece 1 were put together. The diode laser machine having 30 W of the output power that is available form Fine Device Co., Ltd. was used.

The scanning laser beam 3 of the continuous wavelength of 840 nm was irradiated to destination of an indicated arrow onto the put portion by the machine under 750 mm/min. of the scanning speed from above.

The laser beam 3 transmitted through the test piece or the comparative test piece as the laser-transmissible resin workpiece 1, and was absorbed into the test piece as the laser-absorptive resin workpiece 2 to cause the exothermic. The exothermic melted the test piece or the comparative test piece as the laser-transmissible resin workpiece 1 and the test piece as the laser-absorptive resin workpiece 2 at the neighborhood of the position 6. And they were fused to weld and join.

(Determination of Tensile Strength)

As regards the welded pieces of Examples, they were tensed under 10 mm/min. of tensile speed to both opposite dimensions of lengthwise of the test piece or the comparative test piece side of the laser-transmissible resin workpiece 1 and the laser-absorptive test workpiece 2 side: the dimensions pulled the piece 1 and the piece 2 apart, in accordance with Japanese Industrial Standards K 7113-1995 using a tensile strength tester of catalog No. AG-50kNE that is available from Shimadzu Corporation, to determine the tensile strength of welding by the tensile strength test. The results thereof are shown in Table 8.

(Evaluation of Welding)

The cross section at the laser welded position was evaluated by visual observation to classify into two grades. When the position of scanning the laser beam was welded quite uniformly, it is indicated with "o". When the position of scanning the laser beam was not welded uniformly, it is indicated with "x".

The results thereof are shown in Table 8.

TABLE 8

| | Test Piece of Laser-transmissible Resin Workpiece | Test Piece of Laser-absorptive Resin Workpiece | Determination of Tensile Strength (N) | Evaluation of Welding |
|---|---|---|---|---|
| Example 1 | Test Piece (A) | Test Piece (N) | 332 | ○ |
| Example 2 | Test Piece (B) | Test Piece (S) | 205 | ○ |
| Example 3 | Test Piece (I) | Test Piece (O) | 283 | ○ |
| Example 4 | Test Piece (J) | Test Piece (T) | 261 | ○ |
| Example 5 | Test Piece (E) | Test Piece (P) | 137 | ○ |
| Example 6 | Test Piece (A) | Test Piece (L) | 320 | ○ |
| Example 7 | Test Piece (F) | Test Piece (L) | 147 | ○ |
| Example 8 | Test Piece (K) | Test Piece (X) | 300 | ○ |
| Example 9 | Test Piece (G) | Test Piece (W) | 278 | ○ |
| Example 10 | Test Piece (A) | Test Piece (U) | 310 | ○ |
| Comparative Example 1 | Comparative Test Piece (B) | Test Piece (N) | — | Not Welded |
| Comparative Example 2 | Comparative Test Piece (F) | Test Piece (P) | — | Not Welded |
| Comparative Example 3 | Comparative Test Piece (I) | Test Piece (O) | — | Not Welded |
| Comparative Example 4 | Test Piece (L) | Test Piece (N) | — | Not Welded |

As shown in Tables 1 to 8, the laser-transmissible resin workpieces of Manufacturing Examples of the present invention exhibit the whitish hue. And they are joined firmly by the laser welding of Examples, because of the excellent transmission of the laser thereof.

Contrastively the workpieces of Comparative Manufacturing Examples have low whiteness degree. And they are not joined firmly by the laser welding of Comparative Example because of the insufficient transmission of the laser thereof.

INDUSTRIAL APPLICABILITY

The laser-transmissible resin composition of the present invention is suitable for the base materials of the thermoplastic housings of whitish product, that should be joined precisely, such as a precision instrument, electric parts, an electrical appliance, a medical device and daily necessities.

What is claimed is:

1. A method for laser welding comprising:
piling a resin workpiece being at least partly capable of laser-absorption onto a laser-transmissible resin workpiece for laser welding,
wherein:
said resin workpiece is a whitish resin material piece of polycarbonate as a thermoplastic resin including a laser absorbent that absorbs the laser beam of the wavelength for the laser welding, or a whitish resin material piece of polycarbonate as a thermoplastic resin applying a laser-absorptive layer including a laser absorbent that absorbs the laser beam of the wavelength for the laser welding,
the laser-transmissible resin workpiece, whose transmissivity is at least 15% under 840 nm of laser light, exhibits an opaque hue of white and a whiteness degree: $W_1$ of the hue of at least 80, determined from the following numerical expression (I) using L-value, a-value and b-value of L*a*b color specification $$W_1 = 100 - \sqrt{(100-L)^2 + (a^2 + b^2)} \qquad (I),$$

said laser-transmissible resin workpiece is molded out of a laser-transmissible resin composition for laser welding comprising 100 parts by weight of polycarbonate as a thermoplastic resin and 0.01 to 3 parts by weight of titanium oxide that has a density of at least 4 g/cm$^3$, particles having an average particle size of 200 to 270 nm and oil absorption ranging from 15 g to 23 g per 100 g thereof, surfaces of the titanium oxide particles are treated with a surface treatment agent that is selected from the group consisting of aluminum, alumina, aluminum-silicon, aluminum laurate, and aluminum stearate, and said laser-transmissible resin composition exhibits a hue of white; and irradiating a laser beam thereto to weld said resin workpiece and said laser-transmissible resin workpiece thermally.

2. The method for laser welding according to claim 1, wherein a refractive index $n_1$ of said titanium oxide and a refractive index $n_2$ of the thermoplastic resin satisfy following numerical expressions (1) and (2):

$$n_1 - n_2 \geq 1.0 \qquad (1)$$

$$1.4 < n_2 < 1.7 \qquad (2).$$

3. The method for laser welding according to claim 1, wherein the laser-transmissible resin composition further comprises 0.01 to 1 parts by weight of a laser-transmissible colorant to 100 parts by weight of the thermoplastic resin.

4. The method for laser welding according to claim 1, wherein the laser-transmissible resin composition further comprises at least one inorganic filler selected from the group consisting of talc, mica, calcium hydrogencarbonate, calcium carbonate, glass fiber, glass flake, glass beads, wollastonite and barium sulfate.

5. The method for laser welding according to claim 1, wherein the laser-transmissible resin composition further comprises an organic flame retarder.

6. The method for laser welding according to claim 1, wherein the whiteness degree: $W_1$ ranges from 85 to 95.

7. The method for laser welding according to claim 1, wherein the resin workpiece being at least partly capable of the laser-absorption is made from a whitish resin material including a laser-absorbent being capable of the laser-absorption under region of 800 to 1200 nm of wavelength at least partially.

8. The method for laser welding according to claim 7, wherein the resin workpiece being at least partly capable of laser-absorption comprises:
a whitish resin material applied to a laser-absorptive layer comprising a laser-absorbent that is at least partially exhibits laser-absorption in a region of 800 to 1200 nm.

9. The method for laser welding according to claim 7, wherein the laser-absorbent is carbon black and/or nigrosine.

10. The method for laser welding according to claim 7, wherein the hue of the laser-transmissible resin composition has a whiteness degree $W_2$ of at least 80, wherein $W_2$ is determined from the following numerical expression (II) using L-value, a-value and b-value of L*a*b* color specification:

$$W_2 = 100 - \sqrt{(100-L)^2 + (a^2 + b^2)} \qquad (II).$$

11. The method for laser welding according to claim 8, wherein the laser-absorptive layer is a resin film including the laser-absorbent.

12. The method for laser welding according to claim 8, wherein the laser-absorptive layer is applied by ink and/or paint including the laser-absorbent.

* * * * *